US009274836B2

(12) United States Patent
Hildrum et al.

(10) Patent No.: US 9,274,836 B2
(45) Date of Patent: *Mar. 1, 2016

(54) SCHEDULING PARALLEL DATA TASKS (71) Applicant: INTERNATIONAL BUSINESS MACHINES CORPORATION, Armonk, NY (US)

(72) Inventors: Kirsten W. Hildrum, Hawthorne, NY (US); Rohit M. Khandekar, Hawthorne, NY (US); Vibhore Kumar, Hawthorne, NY (US); Sujay S. Parekh, Hawthorne, NY (US); Deepak Rajan, Hawthorne, NY (US); Joel L. Wolf, Hawthorne, NY (US); Kun-Lung Wu, Hawthorne, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/519,732

(22) Filed: Oct. 21, 2014

(65) Prior Publication Data

US 2015/0074681 A1    Mar. 12, 2015

Related U.S. Application Data

(63) Continuation of application No. 12/853,925, filed on Aug. 10, 2010, now Pat. No. 8,930,954.

(51) Int. Cl.
*G06F 9/46*    (2006.01)
*G06F 9/50*    (2006.01)
*G06F 9/48*    (2006.01)

(52) U.S. Cl.
CPC .. *G06F 9/50* (2013.01); *G06F 9/46* (2013.01); *G06F 9/4881* (2013.01); *G06F 9/4887* (2013.01); *G06F 9/5038* (2013.01); *G06F 2209/483* (2013.01)

(58) Field of Classification Search
None
See application file for complete search history.

(56) References Cited

U.S. PATENT DOCUMENTS

| | | | |
|---|---|---|---|
| 5,121,494 A * | 6/1992 | Dias | G06F 17/30445 |
| 6,263,359 B1 | 7/2001 | Fong et al. | |
| 6,957,431 B2 | 10/2005 | Bollella et al. | |
| 7,268,787 B2 | 9/2007 | Hong et al. | |
| 7,340,654 B2 | 3/2008 | Bigagli et al. | |

(Continued)

FOREIGN PATENT DOCUMENTS

EP    1355245 A1    10/2003

OTHER PUBLICATIONS

Jeffrey Dean, et al., "Mapreduce: Simplified Data Processing on Large Clusters," Google In., (DEAN_2004.PDF; p. 1-13).

(Continued)

*Primary Examiner* — Hiren Patel
(74) *Attorney, Agent, or Firm* — F. Chau & Associates, LLC (57) ABSTRACT

A method for allocating parallel, independent, data tasks includes receiving data tasks, each of the data tasks having a penalty function, determining a generic ordering of the data tasks according to the penalty functions, wherein the generic ordering includes solving an aggregate objective function of the penalty functions, the method further including determining a schedule of the data tasks given the generic ordering, which packs the data tasks to be performed.

10 Claims, 4 Drawing Sheets

(56) References Cited

U.S. PATENT DOCUMENTS

| | | | |
|---|---|---|---|
| 7,516,455 B2 * | 4/2009 | Matheson | G06Q 10/06 709/238 |
| 7,590,620 B1 | 9/2009 | Pike et al. | |
| 7,650,331 B1 | 1/2010 | Dean et al. | |
| 8,151,271 B2 * | 4/2012 | Khanna | G06F 9/505 718/100 |
| 8,302,097 B2 | 10/2012 | Buco et al. | |
| 8,407,709 B2 | 3/2013 | Inari | |
| 8,434,085 B2 | 4/2013 | Cialini et al. | |
| 8,458,720 B2 * | 6/2013 | Bansal | G06F 9/5066 718/103 |
| 8,595,732 B2 | 11/2013 | Hildrum et al. | |
| 2005/0204358 A1 * | 9/2005 | Hellerstein et al. | 718/104 |
| 2006/0018179 A1 | 1/2006 | Marchal et al. | |
| 2006/0095912 A1 | 5/2006 | Wood-Gaines et al. | |
| 2007/0198927 A1 | 8/2007 | Sukendro | |
| 2008/0005744 A1 | 1/2008 | Buco et al. | |
| 2008/0082933 A1 | 4/2008 | Howard et al. | |
| 2008/0098370 A1 | 4/2008 | Fontoura et al. | |
| 2008/0127146 A1 | 5/2008 | Liao et al. | |
| 2008/0133474 A1 | 6/2008 | Hsiao et al. | |
| 2009/0007101 A1 | 1/2009 | Azar et al. | |
| 2009/0113432 A1 * | 4/2009 | Singh et al. | 718/102 |
| 2009/0172561 A1 | 7/2009 | Driemeyer et al. | |
| 2009/0222275 A1 | 9/2009 | Cantor et al. | |
| 2009/0282413 A1 | 11/2009 | Cialini et al. | |
| 2009/0300623 A1 | 12/2009 | Bansal et al. | |
| 2010/0095299 A1 | 4/2010 | Gupta et al. | |
| 2010/0131955 A1 * | 5/2010 | Brent et al. | 718/103 |
| 2010/0138833 A1 * | 6/2010 | Franklin et al. | 718/100 |
| 2010/0281166 A1 | 11/2010 | Buyya et al. | |
| 2011/0055843 A1 * | 3/2011 | Keeton et al. | 718/104 |
| 2011/0072436 A1 | 3/2011 | Gilat et al. | |
| 2011/0138391 A1 * | 6/2011 | Cho et al. | 718/102 |
| 2011/0161964 A1 * | 6/2011 | Piazza et al. | 718/102 |
| 2011/0173626 A1 | 7/2011 | Chi et al. | |
| 2011/0246998 A1 * | 10/2011 | Vaidya | G06F 9/4881 718/103 |

OTHER PUBLICATIONS

Haluk Topcuoglu, et al., "Performance-Effective and Low-Complexity Task Scheduling for Heterogeneous Computing," Mar. 2002, IEEE, (TOPCUOGLU_2002.PDF; p. 1-15).

Matei Zaharia, et al., "Job Scheduling for Multi-User Mapreduce Clusters," Apr. 30, 2009, University of California at Berkeley, (ZAHARIA_2009.PDF; p. 1-18).

Shujun Jiang, et al., "Lagrangian Relaxation Algorithm for a Single Machine Scheduling With Release Dates," Second Intertional Symposium on Intelligent Information Technology Application, pp. 811-815, IEEE, Dec. 2008.

Andrew Riffel, et al., "MIO: Fast Multipass Partitioning Via Priority-Based Instructions Scheduling," ACM Digital Library, p. 35-44: 2004.

* cited by examiner

SCHEDULING PARALLEL DATA TASKS

CROSS-REFERENCE TO RELATED APPLICATION

This application is Continuation Application of U.S. patent application Ser. No. 12/853,925, filed Aug. 10, 2010, now U.S. Pat. No. 8,930,954, the entire content of which is incorporated by reference herein.

GOVERNMENT LICENSE RIGHTS

This invention was made with Government support under Contract No. H98230-07-C-0383 awarded by Intelligence Agencys. The Government has certain rights in this invention.

BACKGROUND OF THE INVENTION

1. Technical Field

The present disclosure generally relates to supporting multiple concurrent jobs, and more particularly to a flexible allocation scheme for data parallel tasks.

2. Discussion of Related Art

MapReduce is a framework for processing large datasets (e.g., terabytes of data) involving distributable problems using a large number of commodity hosts (e.g., thousands of computers or nodes). A group of hosts is referred to as a cluster. Processing can occur on data stored either in a file system (unstructured) or within a database (structured). The MapReduce framework is designed to be parallelized automatically. It can be implemented on large clusters, and it inherently scales well. Scheduling, fault tolerance and communications are all handled automatically, without direct user assistance.

MapReduce was originally aimed at large, generally periodic, production batch jobs. As such, the natural goal would be to decrease the length of time needed for a batch window. A dual goal may be to maximize the number of jobs which could be accommodated within a fixed batch window, effectively maximizing throughput. For such scenarios, a simple job scheduling scheme such as First In, First Out (FIFO) works well. FIFO was the first scheduler implemented in Google's MapReduce environment and in Hadoop, an opensource MapReduce implementation.

The use of MapReduce has evolved towards more user interaction. There are now many ad-hoc query MapReduce jobs, and these share cluster resources with the batch production work. For users who submit these queries, expecting quick results, schemes like FIFO do not work well. That is because a large job can "starve" a small, user-submitted job which arrives later. Further, if the large job was a batch submission, the exact completion time of that job might not even be regarded as particularly important.

This unfairness associated with FIFO scheduling motivated the Hadoop Fair Scheduler (HFS). To understand this, MapReduce is described in more detail below together with the goal and design of HFS itself.

MapReduce jobs include two processing phases, a Map phase and a Reduce phase. Each phase is broken into multiple independent tasks, the nature of which depends on the phase. In the Map phase the tasks include the steps of scanning and processing (extracting information) from equal-sized blocks of input data. Each block is typically replicated on disks in three separate racks of hosts (in Hadoop, for example, using the HDFS file system). The output of the Map phase is a set of key-value pairs. These intermediate results are also stored on disk. Each of the Reduce phase tasks corresponds to a partitioned subset of the keys of the intermediate results. There is a shuffle step in which all relevant data from all Map phase output is transmitted across the network, a sort step, and finally a processing step, which may include transformation, aggregation, filtering and/or summarization.

HFS can be said to include two hierarchical algorithmic layers, which will be called the allocation layer and the assignment layer.

Referring to the allocation layer, each host is assumed to be capable of simultaneously handling some maximum number of Map phase tasks and some maximum number of Reduce phase tasks. These are the number of Map slots and Reduce slots, respectively. Typically a host has two Map slots per core, and two Reduce slots per core for processing data tasks. Aggregating these slots over all the hosts in the cluster, the total number of Map slots, and similarly the total number of Reduce slots may be determined. The role of the allocation layer scheme is to partition the number of Map slots among the active Map jobs in some intelligent manner, and similarly the number of Reduce slots among the active Reduce jobs. The node that produces these allocations is known as the master. The HFS allocation layer is referred to as FAIR.

Referring to the assignment layer, it is this layer that makes the actual job task assignment decisions, attempting to honor the allocation decisions made at the allocation level to the extent possible. Host slaves report any task completions at heartbeat epochs (e.g., on the order of a few seconds). Such completions free up slots, and also incrementally affect the number of slots currently assigned to the various jobs. The current slot assignment numbers for jobs are then subtracted from the job allocation goals. This yields an effective ordering of the jobs, from most relatively under allocated to most relatively over allocated. For each currently unassigned slot, the HFS assignment model then finds an "appropriate" task from the most relatively under allocated job that has one, assigns it to the slot, and performs bookkeeping. It may not find an appropriate task for a job, for example, because of rack affinity issues. That is why HFS relaxes fidelity to the precise dictates of the master allocation goals for a time. This is known as delay scheduling.

In the Map phase, for example, the FAIR allocation scheme is fair in the following sense: It determines, for each of J Map phase jobs j, a minimum number $m_j$ of Map slots. This minimum number is chosen so that the sum $\Sigma_{j=1}^{J} m_j \leq S$. The minima are simply normalized if needed. This minimum number $m_j$ acts as a fairness guarantee, because FAIR will always allocate a number of Map slots $s_j \geq m_j$, thereby preventing job starvation. Slack (the difference $S - \Sigma_{j=1}^{J} m_j$) is allocated in FAIR according to a waterline based greedy scheme. Analogous statements hold for the Reduce phase.

While HFS mentions standard scheduling metrics such as throughput or average response time as a goal of the scheduler, and compares its scheduler to others in terms of these, FAIR is motivated by and oriented towards system issues. It makes no direct attempt to optimize such metrics.

According to an embodiment of the present disclosure, a need exists for a flexible allocation scheme for data parallel tasks that improves the performance of a system.

BRIEF SUMMARY

According to an embodiment of the present disclosure, a method for allocating parallel, independent, data tasks includes receiving a plurality of parallel, independent, data tasks, each of the plurality of parallel, independent, data tasks having a penalty function, determining a generic ordering of the parallel, independent, data tasks according to the penalty functions, wherein the generic ordering includes solving an aggregate objective function of all the penalty functions, the method further including determining a schedule of the parallel, independent, data tasks given the generic ordering, which packs the parallel, independent, data tasks to be performed According to an embodiment of the present disclosure, a method for packing parallel, independent, data tasks, the computer program product includes receiving a plurality of parallel, independent, data tasks and an input ordering of the parallel, independent, data tasks, allocating a minimum number of slots to each of the parallel, independent, data tasks, wherein slots are units of execution, iteratively allocating additional slots according to the input ordering, and determining a schedule of the parallel, independent, data tasks given the input ordering, which packs the parallel, independent, data tasks to be performed.

BRIEF DESCRIPTION OF THE SEVERAL VIEWS OF THE DRAWINGS

Preferred embodiments of the present disclosure will be described below in more detail, with reference to the accompanying drawings.

DETAILED DESCRIPTION

According to an embodiment of the present disclosure, clusters of hosts are designed to support multiple concurrent jobs. The flexible scheduling allocation scheme described herein is referred to as FLEX. According to an embodiment of the present disclosure, the FLEX allocation scheduler may optimize any of a variety of standard scheduling theory metrics while ensuring minimum job slot guarantees. The FLEX allocation scheduler is fair in the sense that it avoids job starvation. The metrics of the FLEX allocation scheduler can be chosen by a system administrator on a cluster-wide basis, or by individual users on a job-by-job basis. These metrics can be chosen from a menu that includes response time, makespan (e.g., dual to throughput), stretch, and any of several metrics which reward or penalize job completion times compared to possible deadlines. More generally, consider the example of negotiating Service Level Agreements (SLAs) with MapReduce users for which a penalty depends on the level of service achieved. Formally, this can be described by a step function penalty function, each step corresponding to the penalty that would be incurred by missing the previous pseudo-deadline but making the next one. The FLEX allocation scheduler may work towards optimizing any combination of these metrics while simultaneously ensuring fairness. It can minimize the sum, and hence the average, of all the individual job penalty functions or the maximum of all of them. While many system administrators can be expected to make a single choice of metric, there are examples of job-by-job choices. For example, it makes sense to employ different metrics for a batch job and an ad-hoc query.

Note that the FLEX allocation scheduler can be regarded as either a standalone replacement to FAIR or as an add-on module that works synergistically with FAIR: To understand this point consider HFS handing FLEX the Map phase minimum slots $m_1, \ldots, m_J$. After optimizing the appropriate scheduling metrics, FLEX hands back slot allocations $s_1, \ldots, s_J$ such that $s_j \geq m_j$ for all jobs j, and there is no slack: $\Sigma_{j=1}^{J} s_j = S$. These values $s_j$ can then serve as revised minima to be handed to FAIR. Because there is no slack, the scheme in FAIR for equitably allocating the slack will be neutralized. Thus, FAIR will produce the properly optimized solution $s_1, \ldots, s_J$. A similar statement holds for the Reduce phase.

Additionally, the FLEX allocation scheme can handle maximum slots $M_j$ for a given job j as well as minima, and they are implicitly dealt with in FAIR as well. For example, at the end of the Map phase the number of remaining tasks for a particular job may be less than the total number of Map slots S. In this case, there is no reason to allocate more slots than the current demand.

Scheduling Theory Concepts

The FLEX scheduler may be conceptualized as including five categories of penalty functions which might be optimized. The penalty functions may include multiple variants. Here, epoch-based scheduling is described, FLEX being an example. In addition, the notion of a speedup function is defined, and how it pertains to moldable and malleable scheduling. These models fit with the details of MapReduce scheduling, while FAIR and FLEX fit together. With these concepts as a base, the algorithmic details of FLEX are further described.

Penalty Functions

Consider each job as having a penalty function that measures the cost of completing that job at a particular time. Thus each of FIGS. 1A-E describes the form of a particular per job penalty function or a per job objective function metric. The x-axis represents the completion time of that job, while the y-axis represents the penalty. There may be many potential problem variants for the functions. These combinatorial alternatives involve, for example, whether or not to incorporate non-unit weights into the penalty functions. In some cases specific weight choices will have special meanings. In other cases they are used to define the relative importance of each job. Also, typically the functions seek to minimize the sum of all the per job penalty functions or to minimize the maximum of all the per job penalty functions. The former case is referred to as a minisum problem, and the latter case as a minimax problem. The penalty function categories may include response time, number of tardy jobs, tardiness, lateness and SLA costs.

Figure 1A:
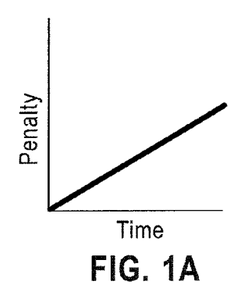
FIGS. 1A-E are illustrations of per job objective function metrics according to exemplary embodiments of the present disclosure.
Figure 1B:
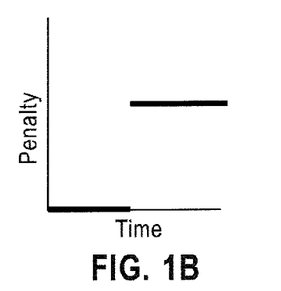
Figure 1C:
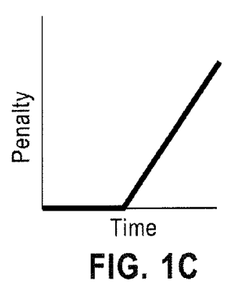
Figure 1D:
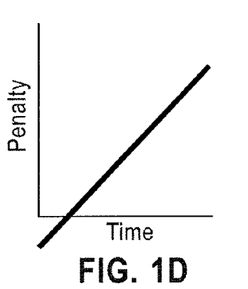
Figure 1E:
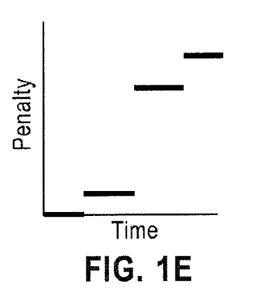

Referring to the response time penalty function, the weight of this metric, exemplified in FIG. 1A (weighted response time), is the slope of the linear function. In an unweighted, or unit-slope case, solving the minisum problem would minimize the total response time of all jobs. In the unweighted case, the minimax problem may be used to minimize the makespan of the jobs. This is the completion time of the last job to finish and is appropriate for optimizing batch work. Suppose the work (or time required to perform job j in isolation) is $W_j$. Then the completion time of a job divided by $W_j$ is known as the stretch of the job, a measure of how delayed the job will be by having to share the system resources with other jobs. Thus, solving a minisum problem while employing weights $1/(JW_j)$ will minimize the average stretch of the jobs. Similarly, solving a minimax problem while employing weights $1/W_j$ will minimize the maximum stretch. Either of these are fairness measures.

Referring to the number of tardy jobs function, in this case each job j has a deadline, say $d_j$. In this case only the minisum problem is appropriate. The weight is the height of the "step" in FIG. 1B (weighted number of tardy jobs). The unweighted case counts the number of jobs that miss their deadlines. But the weighted case makes sense as well.

Referring to the tardiness function; each job j has a deadline, say $d_j$. The tardiness metric generalizes the response time metric, which can be said to employ deadlines at time 0. Only tardy jobs are "charged", and the slope of the non-trivial line segment in FIG. 1C (weighted tardiness)) is the weight. It makes sense to speak of either minisum or minimax tardiness problems, both either weighted or unweighted.

Referring to the lateness function (see FIG. 1D), each job j has a deadline, say $d_j$. The lateness metric generalizes response time also, with the same explanation as that of tardiness above. As before, the weight is the slope of the line. Note that "early" jobs are actually rewarded rather than penalized, making this a potentially negative metric. The minisum variant differs from the response time metric by an additive constant, and thus can be solved in exactly the same manner as that problem. Therefore, the minisum variant will not be considered further.

Referring to the SLA costs function, in this metric each job j has potentially multiple pseudo-deadlines $d_{i,j}$ which increase with i. And the penalties $w_{i,j}$ increase with i also. This yields the metric of FIG. 1E (SLA Penalties), including a step function for each job, clearly a generalization of the weighted number of tardy jobs metric. As in that case, only the minisum problem is appropriate. One can think of this metric as the total cost charged to the provider based on a pre-negotiated SLA contract.

Epoch-Based Scheduling

FLEX is an epoch-based allocation scheduler. This means that it partitions time into epochs of some fixed length T. So if time starts at t=0 the epochs will start at times 0, T, 2T, 3T and so on. Label these as epochs 0, 1, 2, 3 and so on. The scheduler will produce allocations that will be in effect for one epoch, so that the $e^{th}$ epoch allocations will be honored from time eT to time (e+1)T.

There will be two instances of FLEX running at any given time, one for the active Map phase jobs and one for the active Reduce phase jobs. The Map instance is described below, while the Reduce instance is comparable.

The Map instance of FLEX receives input describing the total number of Map slots in the system, the number of active Map jobs, the minimum and maximum number of slots per active Map job, and estimates of the remaining execution times needed for each of the active Map jobs. Then allocations of slots are output to the active Map jobs. These allocations may be time-dependent in the sense that there may be several consecutive intervals, I, of different allocation levels. In more detail, consider the $e^{th}$ epoch. The output can take the form $(s_{1,1}, \ldots, s_{1,J}, T_0, T_1), \ldots, (s_{I,1}, \ldots, s_{I,J}, T_{I-1}, T_I)$, where $T_0 = eT$, the $i^{th}$ interval is the time between $T_{i-1}$ and $T_i$, and $s_{i,j}$ represents the number of slots allocated to job j in interval i. Allocations for the $e^{th}$ epoch will likely extend beyond the start time of the $(e+1)^{st}$ epoch. That is, it can be expected that $T_I > (e+1)T$. But any of these allocation decisions will be superseded by the decisions of newer epochs. It is expected that the completion time of the first of the consecutive intervals in the eth epoch will typically exceed the length of an epoch, so that $T_1 > (e+1)T$. This means that typically only the first interval in the FLEX output will be enforced by the assignment model during each epoch.

The work of FLEX for the $e^{th}$ epoch needs to be completed by the start time eT of that epoch. Since the epochs of FLEX are intended to be performed in sequence this means that all of the steps (input, think-time and output) must be performed within the time T of one epoch. If T is relatively small it follows that FLEX must be comparably fast.

Speedup Functions

From a scheduling perspective, one feature of both the Map and Reduce phases of a MapReduce job is that they are parallelizable. The MapReduce job is composed of many atomic tasks that are independent of each other and therefore can be performed on a relatively arbitrary number of (multiple slots in) multiple hosts simultaneously. If a given job is allocated more of these slots it will complete in less time. In the case of the Map phase these atomic tasks correspond to the blocks. In the case of the Reduce phase the atomic tasks are created on the fly, based on keys. The FLEX scheme takes advantage of this additional structure in the MapReduce paradigm.

Turning to the relevant scheduling theory concepts, consider a total of S homogeneous hosts. In the exemplary scenario present herein the hosts will actually be the total number of Map or Reduce slots in the cluster. A job is said to be parallel if it can be performed using some number of hosts $1 \leq s \leq S$ simultaneously, with an execution time E. One can think geometrically of this job as a rectangle with width equal to the number of hosts s, and height equal to the execution time E. A job is said to be parallelizable if it can be performed variously on an arbitrary number $1 \leq s \leq S$ of hosts simultaneously, with an execution time F(s) that depends on the number of hosts allocated. The execution time function F is the speedup function. It can be assumed without loss of generality to be non-increasing, because if F(s)<F(s+1) it will be better to leave one host idle. This would result in a new (replacement) speedup function $\bar{F}$ for which $\bar{F}(s+1) = \bar{F}(s) = F(s)$. One can think, also without loss of generality, of a job that can be performed on a subset $P \subseteq \{1, \ldots, S\}$ of possible allocations of hosts as being parallelizable: define $F(s) = \min_{\{p \in P | p \leq s\}} F(p)$, where, as per the usual convention, the empty set has minimum ∞. In this sense parallelizable is a generalization of parallel.

Figure 2A:
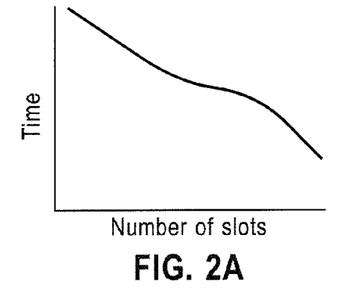
FIGS. 2A-D illustrate moldable and malleable models according to an embodiment of the present disclosure.

As will be describe below, both the Map and Reduce phases of a MapReduce job have such speedup functions. FIG. 2A illustrates an exemplary speedup function in a MapReduce context. Note that the x-axis is described in terms of allocated slots.

Moldable and Malleable Scheduling

The problem of scheduling multiple parallel jobs in order to minimize some given metric can be visualized as a problem of packing rectangles, with job start times as the decision variables. Problems for most of the natural metrics are NP-hard.

Figure 2B:
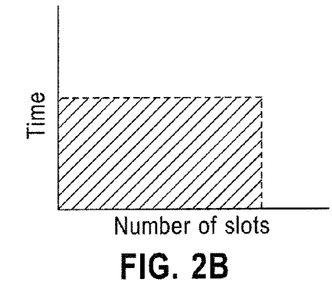

Parallelizable scheduling is a generalization of parallel scheduling. One exemplary variant is moldable scheduling. Here the problem is to schedule multiple parallelizable jobs to optimize a given metric. The number of hosts is treated as an additional decision variable, but once this allocation is chosen it cannot be changed during the entire execution of the job. The rectangles themselves can be thought of as moldable: Pulling a rectangle wider, or giving a job more hosts, has the effect of making the rectangle less high, or executing the job faster. FIG. 2B illustrates a potential choice of host (slot) allocations for a moldable job in a MapReduce context. The top-right vertex in the rectangle corresponds to a point on the speedup function of FIG. 2A. Moldable scheduling problems can, in some cases, be solved by using the parallel scheduling problem as a subroutine.

Figure 2C:
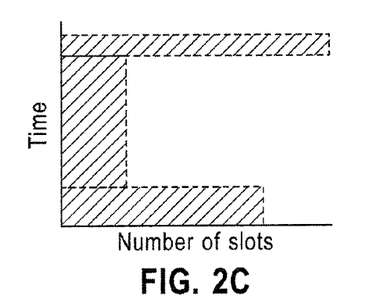

Further, one can generalize moldable scheduling as well, to so-called malleable scheduling. Here the problem is to schedule multiple parallelizable jobs to optimize a given metric, as before. Here, instead of making a permanent decision as to the host allocations, each job can proceed in multiple intervals. Different intervals can involve different allocations. Each interval contributes a portion of the total work required to perform the job. FIG. 2C illustrates a potential three interval choice of host (slot) allocations for a malleable job in a MapReduce context.

An optimal malleable schedule for a particular scheduling problem instance will have a cost less than or equal to that of an optimal moldable schedule for the same problem instance, since moldable schedules are also malleable. Herein, methods are described for finding an optimal malleable scheduling solution for each of the relevant objective functions. For the generic problem, the moldable scheduling problem is solved first. The solution helps to solve the more general malleable problem.

Malleable Scheduling and the Model

In terms of how well the MapReduce model fits the malleable scheduling framework, there are several aspects to the answer.

For example, the parallel job structure in MapReduce is a direct consequence of the decomposition into small, independent atomic tasks. Consider the assignment layer. Its role is to approximate at any given time the decisions of the allocation layer by assigning job tasks. Consider FIG. 2D, over time, the assignment layer will nearly replicate the malleable allocation decisions given in FIG. 2C by a set of job task to slot decisions. The approximation is not perfect, for several reasons. For example, slots may not free up at precisely the time predicted by the allocation layer. So new task slots won't be assigned perfectly; at the bottom of each interval the rectangle may be slightly jagged. Likewise, slots may not end at precisely the time predicted by the allocation layer. Thus, at the top of each interval the rectangle may be slightly jagged. Moreover, the assignment layer may relax adherence to the exact allocation goals for the various jobs, for example, to ensure host or rack locality.

Figure 2D:
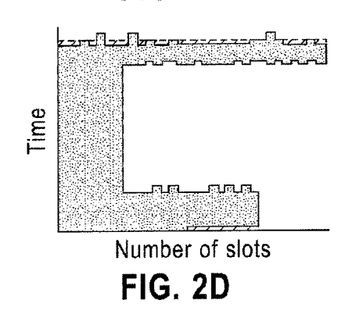

The job speedup function (FIG. 2A) and moldable job function (FIG. 2B) are modest approximations because individual task times are small relative to the total time needed for the job. Discrepancies between the allocation layer goals and the assignment layer are modest by definition. In summary, as illustrated in FIGS. 2C-D, the malleable scheduling model fits the reality of the MapReduce paradigm closely.

Moreover, because the tasks are independent, the total amount of work involved in a job is the sum of the work of the individual tasks. Therefore, in conjunction with the statements above, a certain speedup function can be assumed; the speedup should be close to linear, meaning a speedup function of the form $F(s)=C/s$ between its minimum and maximum numbers of slots. Here C is a constant for a job proportional to the amount of work needed to perform that job (here, work is the time needed to perform the job on a single core or processor.) Note that this is not a statement particularly affected by the factors such as locality. Such factors would affect the constant, not the shape of the speedup function.

Speedup functions for individual jobs need to be estimated for FLEX. By assuming relative uniformity among the job task times, one can continually extrapolate the times for the remaining tasks from the times of those tasks already completed. In this manner the refined estimates may become more accurate as the job progresses, epoch by epoch. Periodic jobs can also be seeded with speedup functions obtained from past job instances.

FLEX

The FLEX allocation scheduler works identically for the Map phase and the Reduce phase. Thus, the FLEX allocation scheduler is described hereafter in a phase-agnostic manner. The FLEX allocation scheduler depends on two concepts:

1. Given any ordering of the jobs, a Malleable Packing Scheme (MPS) is described to determine a schedule. For any of our possible metrics, there will exist a job ordering for which the MPS schedule will actually be optimal. The job ordering is strictly input to the packing scheme. There is no guarantee, for example, that the jobs will complete in that order in the MPS schedule.

Figure 4:
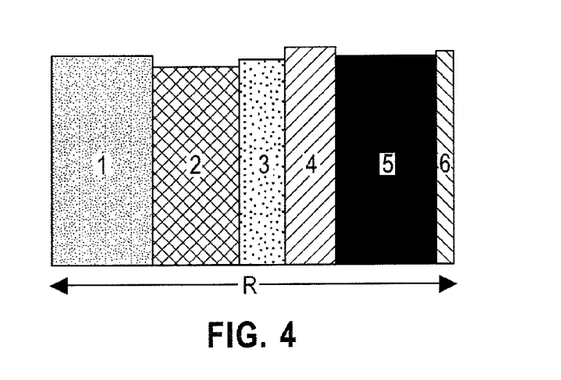
FIG. 4 is an exemplary moldable RAP solution according to an embodiment of the present disclosure.

2. An ordering for any of the possible metrics may be found by employing an essentially generic method to solve a so-called Resource Allocation Problem (RAP). The solution to this RAP will be optimal in the context of moldable scheduling, assuming positive minima for each job. In terms of malleable schedule the solution will not be optimal. FIG. 4 is an exemplary moldable RAP solution.

Combining these concepts, FLEX creates a generic ordering and a number of specific orderings, feeding each of them to MPS. The output is a found MPS solution.

Malleable Packing Scheme

The pseudocode for the malleable packing scheme found in Appendix A exemplifies a method wherein, given a priority ordering, the scheme proceeds iteratively. At any iteration a current list $\mathcal{L}$ of jobs is maintained, ordered by priority. Time is initialized to $T_0=0$. The current list $\mathcal{L}$ is initialized to be all of the jobs, and one job is removed from $\mathcal{L}$ at the completion time $T_i$ of each iteration i. Call the time interval during iteration i (from time $T_{i-1}$ to $T_i$) an interval. The number of slots allocated to a given job may vary from interval to interval, thus producing a malleable schedule.

The $i^{th}$ iteration of the method involves the following steps: the scheme allocates the minimum number $m_j$ of slots to each job $j \in L$. This is feasible, since the minima have been normalized, if necessary, during a precomputation step. After allocating these minima, some slack may remain. This slack can be computed as $s=S-\Sigma_{j \in L} m_j$. The remaining allowable slots $M_j-m_j$ are allocated to the jobs j in priority order. The first several may get a full allocations, and those jobs will be allocated a maximum number of slots, namely $M_j=m_j+(M_j-m_j)$. Ultimately all S slots may get allocated in this manner, leaving at most one job with a "partial" remaining allocation of slots, and any jobs having lower priority with only their original, minimum number of slots. Additional details of these steps are given in the pseudocode. Given this set of job allocations, one of the jobs j will complete first, at time $T_1$. Ties among jobs may be adjudicated in priority order. Job j is removed from L, and the remaining work past time $T_1$ is determined for those jobs remaining in L.

After J iterations (and J intervals) the list $\mathcal{L}$ will be depleted and the malleable schedule created.

Figure 3A:
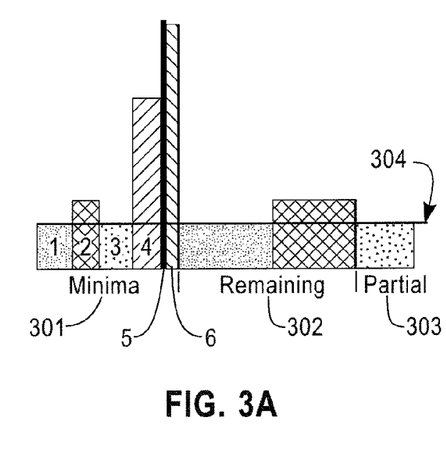
FIG. 3A-D. illustrate a packing scheme according to an embodiment of the present disclosure.
Figure 3B:
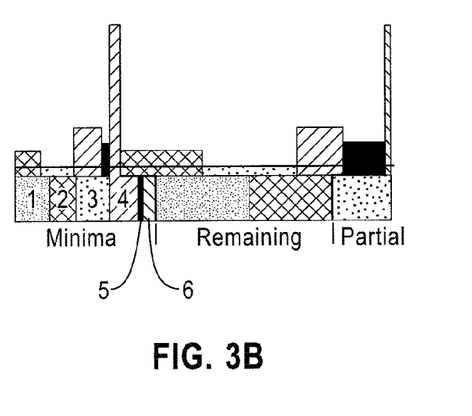
Figure 3C:
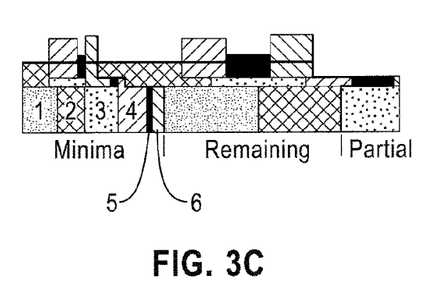
Figure 3D:
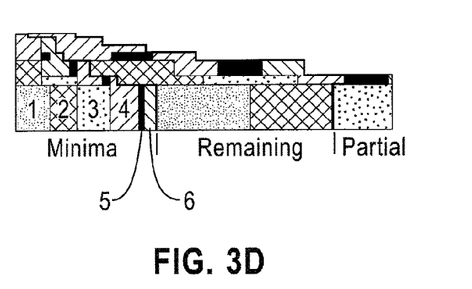

FIGS. 3A-C show the first three "intervals" or layers in the malleable packing iterative process for a 6-job example. The priority ordering is indicated by numbers 1-6, wherein jobs having the same shading/texture have the same priority. Note the jobs getting their minimum number of slots 301, the jobs which get their remaining number of slots (up to their maximum) 302, and the single job getting a partial number of slots between its minimum and its maximum 303. At each of these intervals the completion time $T_i$ is shown as a horizontal line 304. The interval extends from the previous time $T_{i-1}$ to the current time $T_i$, as noted, and the portion of the schedule beyond this time is discarded. Note that each new iteration involves one fewer job—this job may or may not be the next job in the priority ordering. The final malleable packing is shown in FIG. 3D. In this example there are 6 intervals.

Under linear speedup assumption, for any of the metrics considered here, there exists an ordering of jobs such that the MPS schedule is optimum. Specifically, assume that each job satisfies linear speedup, i.e., the speedup function of job j has the form $F_j(s)=C_j/s$ where $C_j$ is a constant depending on j. Fix any minisum or minimax aggregate objective function of non decreasing per job penalty functions of the completion time of the jobs. There exists an ordering $\mathcal{L}$ of the jobs such that the MPS method with $L=\mathcal{L}$ outputs an optimum schedule for the given objective function (see FIG. 3D).

Finding a Priority Ordering

Based on the previous paragraph, an ordering $\mathcal{L}$ on jobs is determined for which the MPS method performs well. Finding optimum such ordering is NP-hard for many metrics. Therefore, the priority ordering of jobs to use in the malleable packing scheme is determined by solving a simplified variant of the overall scheduling problem. More specifically, the completion time ordering of the jobs for the method will become the input priority ordering to the malleable packing scheme. In the case of the generic scheme the simplified problem will be a moldable version of the original problem. In the case of the metric-specific schemes a closer, malleable version of the problem will be considered.

Generic Scheme; regardless of the specific metric chosen, finding the optimal moldable schedule can be formulated as a separable Resource Allocation Problem (RAP). In the first category the sum is minimized, while in the second category the maximum is minimized. Consider:

$$\text{Minimize} \sum_{j=1}^{J} F_j(s_j) \quad (1)$$

or $$\max_{1 \leq j \leq J} F_j(s_j)$$

$$\text{subject to} \sum_{j=1}^{J} s_j \leq S \quad (2)$$

and $$m_j \leq s_j \leq M_j$$
$$\forall\, 1 \leq j \leq J$$

Separability here means that each summand $F_j(s_j)$ is a function of a single decision variable $s_j$, and such resource allocation problems can be solved exactly.

Minisum separable RAPs can be solved by one of several means, considering whether or not the functions involved are convex. If the individual functions happen to be convex the problem can be solved by one of three standard methods: These are the schemes by Fox (F), Galil and Megiddo (GM) and Frederickson and Johnson (FJ), which can be regarded as fast, faster and (theoretically) fastest, respectively. The FJ scheme, which is described in the exemplary implementation of FLEX herein, has complexity, $O(\max(J, J \log(S/J)))$. Pseudocode for FJ is given in Appendix B. If the individual functions, on the other hand, are not convex, the problem may still be solved by a dynamic programming (DP) method. This scheme has complexity $O(JS^2)$. Pseudocode for the DP is given in Appendix C.

Checking for convexity of the underlying summands may be done for the various metrics. Specifically, only the (weighted) number of tardy jobs and the (weighted) total tardiness needs the more expensive DP. See the Minisum problems in Table 1.

TABLE 1

| Generic Ordering Algorithm | | |
|---|---|---|
| Metric | Minisum Algorithm | Minimax Algorithm |
| Weighted Response Time | FJ | FJ |
| Weighted Number of Tardy Jobs | DP | FJ |
| Weighted Tardiness | DP | FJ |
| Weighted Lateness | FJ | FJ |
| SLA | DP | FJ |

For minimax separable RAPs, as long as the functions $F_j$ are non-decreasing, as in the metrics described herein, the minimax problem can be reduced naturally to a minisum convex separable RAP: The transformation is via the functions $G_j(s_j)=\sum_i^{s_j} F_j(i)$. The transformed function is convex because the original function $F_j(s_j)$ is non-decreasing. Also note that the first differences of $G_j$ correspond to $F_j$. A telescoping argument then shows that the solution to the separable convex RAP of minimizing $\Sigma_j G_j(s_j)$ subject to the constraints $\Sigma_j s_j \leq S$ and $m_j \leq s_j \leq M_j$ corresponds precisely to the solution to the minimax RAP for $F_j(s_j)$.

This means that one can apply any of the fast schemes, such as FJ, to each of the category 2 problems. Again, see Table 1.

In summary, exemplary pseudocode for a method of solving the RAP and building the MPS schedule, is given in Appendix D.

Figure 5A:
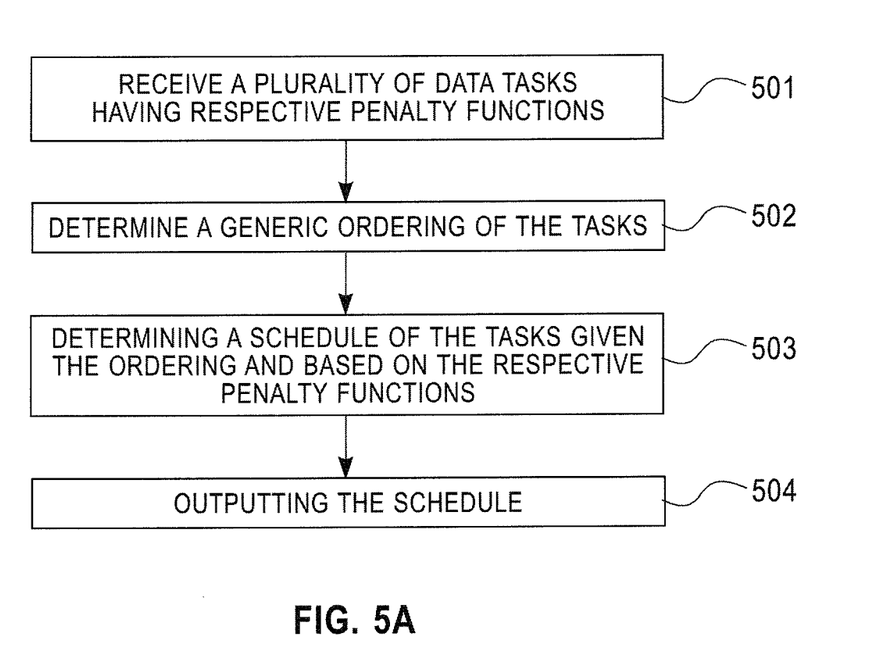
FIGS. 5A-B are flow diagrams of a method of allocating parallel, atomic, data tasks according to an embodiment of the present disclosure.
Figure 5B:
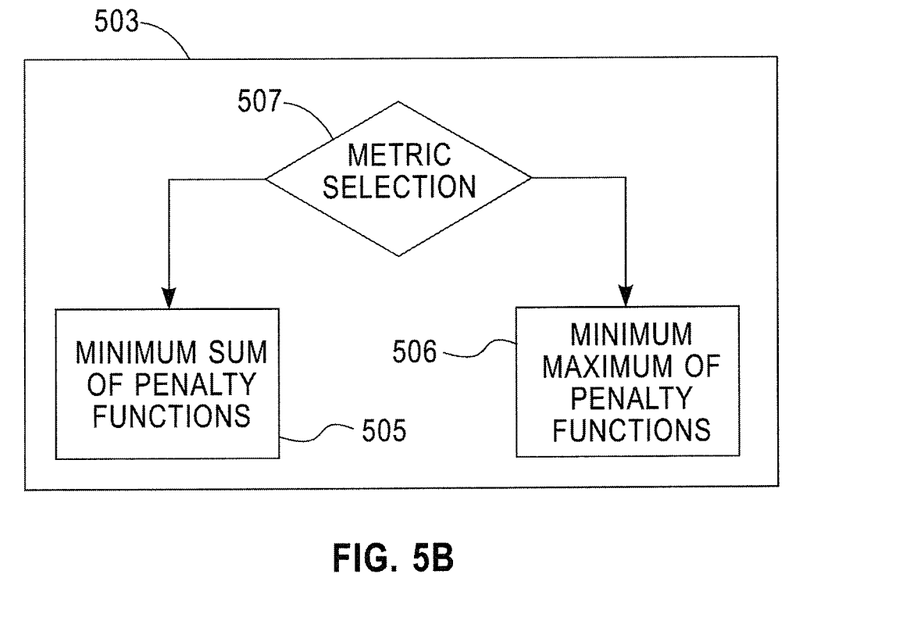

In view of the for going, referring to FIG. 5A, allocating parallel, atomic, data tasks includes receiving a plurality of parallel data tasks 501, each of the plurality of parallel data tasks having a penalty function, determining a generic ordering of the parallel data tasks 502 according to the penalty functions, wherein the generic ordering includes determining a minimum sum of the penalty functions 505 (FIG. 5B), and determining a minimum maximum of the penalty functions 506 (FIG. 5B). The metric may be a user selection 507. The method further including determining a schedule of the parallel data tasks given the generic ordering, which packs the data tasks to be performed in a minimum time 503. The schedule may be output to a computer system (e.g., cluster of computers) processing the plurality of parallel data tasks.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
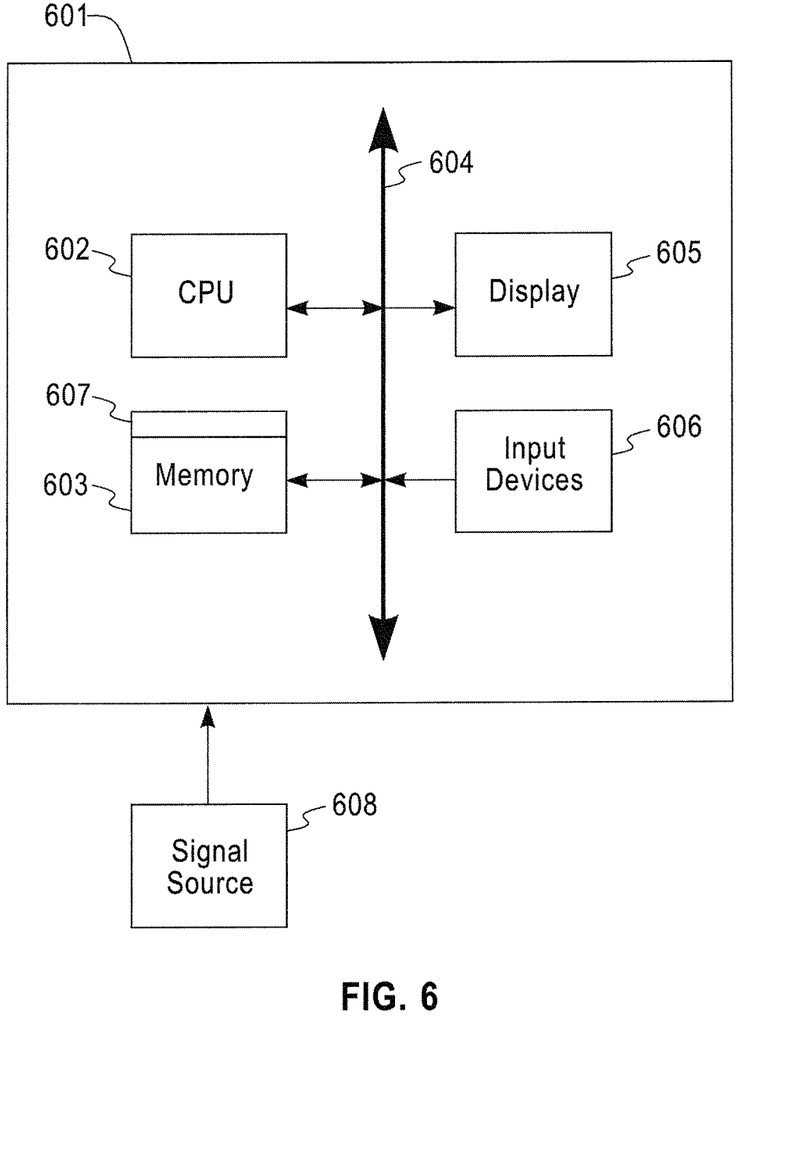
FIG. 6 is a computer system for implementing a method according to an embodiment of the present disclosure.

Referring to FIG. 6, according to an embodiment of the present disclosure, a computer system 601 for implementing a flexible allocation scheme for data parallel tasks can comprise, inter alia, a central processing unit (CPU) 602, a memory 603 and an input/output (I/O) interface 604. The computer system 601 is generally coupled through the I/O interface 604 to a display 605 and various input devices 606 such as a mouse and keyboard. The support circuits can include circuits such as cache, power supplies, clock circuits, and a communications bus. The memory 603 can include random access memory (RAM), read only memory (ROM), disk drive, tape drive, etc., or a combination thereof. The present invention can be implemented as a routine 607 that is stored in memory 603 and executed by the CPU 602 to process the signal from the signal source 608. As such, the computer system 601 is a general-purpose computer system that becomes a specific purpose computer system when executing the routine 607 of the present invention.

The computer platform 601 also includes an operating system and micro-instruction code. The various processes and functions described herein may either be part of the micro-instruction code or part of the application program (or a combination thereof) which is executed via the operating system. In addition, various other peripheral devices may be connected to the computer platform such as an additional data storage device and a printing device.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Having described embodiments for a flexible allocation scheme for data parallel tasks, it is noted that modifications and variations can be made by persons skilled in the art in light of the above teachings. It is therefore to be understood that changes may be made in exemplary embodiments of disclosure, which are within the scope and spirit of the invention as defined by the appended claims. Having thus described the invention with the details and particularity required by the patent laws, what is claimed and desired protected by Letters Patent is set forth in the appended claims.

APPENDIX A

Malleable Packing Scheme Pseudocode

1: Set time $T_0 = 0$
2: Create list $\mathcal{L} = \{1,...,J\} = \{1, ..., J\}$ of jobs, ordered by priority
3: for $i = 1$ to $J$ do
4:    Allocate $m_j$ slots to each job $j \in \mathcal{L}$
5:    Set $L = \mathcal{L}$ with implied ordering
6:    Determine slack $s = S - \Sigma_{j \in L} m_j$
7:    while $s > 0$ do
8:      Allocate $\min(s, M_j - m_j)$ additional slots to highest priority job $j \in L$
9:      Set $L = L \setminus \{j\}$
10:     Set $s = s - \min(s, M_j - m_j)$
11:   end while
12:   Find first job $j \in \mathcal{L}$ to complete under given allocations
13:   Set $T_i$ to be the completion time of job $j$
14:   Set $\mathcal{L} = \mathcal{L} \setminus \{j\}$
15:   Determine remaining work for jobs $\mathcal{L}$ in after time $T_i$
16: end for

APPENDIX B

Frederickson and Johnson Method

```
For (j=1;j<=T,j++)
{
    For (s=1;s<=S;s++)
    {
        If (m_j <=s <=M_j)
        {
            Compute D(j,s)=F_j(s)-F_j(s-1)
        } else if (m_j > s) {
            Set D(j,s)= - infinity
        } else {
            Set D(j,s)= + infinity
        }
    }
}
s=CUT(S)
while (s>n+(1/a^2))
{
    REDUCE(S,s)
}
Compute Sth smallest element remaining, using standard selection
algorithm
Procedure: CUT(s)
Set N=Js
If (s<J)
{
    Choose the sth smallest element D(j*,1) in {D(j,1)}.
    Find partition (J1, j*, J2) of J such that card{J1}=s-1,
    D(j,1)<=D(j*,1) for all j in J1,
    D(j,1)>=D(j*,1) for all j in J2
    Reindex J1 union {j*} by {1,...,s}
    Set J=s and t=s2
}
if (t<(9/2)s EXIT
for (k=0,k<q=max{k such that j_k < j_{k-1} and i_k <=s}
{
    Compute j_k=floor(J/2k)+1
    Compute i_k=ceil((s+1)/jk)
    Compute i_0=1 and i_{q+1} = s+1
}
For (k=1,k<=q,k++)
{
    Select the j_k th smallest element D(j_k*, i_k) from first j_{k-1}-1 elements
    of row i_k.
    Find partition (J_{k1}, j_k*, J_{k2}) of {1,...j_{k-1}-1} such that card{j_{k1}}=j_k-1,
    D(j,i_k)<=D(j*,i_k)
```

-continued

```
    for j in J_{k1} and D(j,i_k)>=D(j_k*,i_k) for j in J_{k2}
    Reindex appropriately
    Set u=i_k-1 for j=j_k, ...j_{k-1}-1
}
Set t to be the sum of the u_j
if (t<=(9/2)s EXIT
Set Q={(i_k,j)}
Set w(i_k,j)=i_{k+1}-i_k
Apply weighted selection algorithm and find partition (Q1, (i_k*,j*),Q2) of
Q such that
D(j,i_k)<=d(i_k*) for (i_k,j) in Q1, D(j,i_k)>=D(j*,i_k*) for (i_k,j) in Q2,
and the sum for Q1 of
the w(i_k,j) <4s < the sum for Q2 of the w(i_k,j)
Set u_j=max{0,{i_{k+1}-1 such that (i_k,j) is in Q-Q2}
EXIT
Procedure: REDUCE(S,s)
If (S>=s/2)
{
    for (j=1;j<=J,j++)
    {
        Set i_j=l_j+a(u_j-l_j+1)
        Set w_j=u_j-l_j+1 for D(j,i_j)
    }
    Apply weighted selection algorithm to {1,...,J} to find partition
    (P1,j*,P2) such
    that D(j,i_j) <=D(j*,i_j*) for j in P1, D(j,i_j)>=d(j*,i_j*) for j in P2 and so
    that (1-a)s lies between the sum over P1 of w_j and w_j* plus the sum
    over P1 of w_j
        Update S = S minus the sum A over P1 union {j} of i_j-l_j+1
    Update t=t-A
    Update l_j=i_j+1_j for j in P1 union {j*}
} else {
    for (j=1;j<=J,j++)
    {
        Set i_j=u_j-a(u_j-l_j+1)
        Set w_j=u_j-l_j+1 for D(j,i_j)
    }
    Apply weighted selection algorithm to {1,...,J} to find partition
    (P1,j*,P2) such
    that D(j,i_j) <=D(j*,i_j*) for j in P1, D(j,i_j)>=d(j*,i_j*) for j in P2 and so
    that (1-a)s lies
    between the sum over P1 of w_j and w_j* plus the sum over P1 of w_j
        Update S = S minus the sum A over P2 union {j} of u_j- i_j+1
    Update t=t-A
    Update u_j=i_j for j in P2 union {j*}
}
```

APPENDIX C

Dynamic Programming Method

```
for (j=1; j<=J; j++)
{
    For (s=0;s<=S;s++)
    {
        Fbest(j,s)=min m_j<=t<=M_j (Fbest(j-1,s-t)+F_j(t))
        Xbest(s,j)= arg min m_j<=t<=M_j (Fbest(j-1,s-t)+F_j(t))
    }
}
```

APPENDIX D

Flex Method

1.   If (minimax objective) {
2.      Solve FJ and output ordering of jobs
3.   } else if (weighted response time or weighted lateness) {
4.      Solve FJ and output ordering of jobs
5.   } else {

-continued

Flex Method

| | |
|---|---|
| 6. | Solve DP and output ordering of jobs |
| 7. | } |
| 8. | } |
| 9. | Solve MPS with ordering of jobs as input |
| 10. | Output malleable schedule |

What is claimed is:

1. A computer program product comprising:
a non-transitory computer readable storage medium having computer readable program code embodied therein, the computer readable program code comprising:
computer readable program code configured to receive a plurality of parallel and independent data tasks associated with a job, each of the parallel and independent data tasks having a penalty function, wherein a sum of penalty functions measures a cost of completing the job at a particular time; and
computer readable program code configured to determine a planned allocation of slot resources over time for the plurality of parallel and independent data tasks, the planned allocation being based upon penalty function costs such that the planned allocation optimizes user-entered metrics for the job,
wherein the planned allocation of slot resources comprises:
choosing the user-entered metrics from a menu comprising response time, makespan, stretch and any metric which rewards or penalizes job completion time as compared to deadlines by a system administrator on a cluster-wide basis, or by individual users on a job-by-job basis;
optimizing the user-entered metrics while ensuring minimum job slot guarantees, and avoiding job starvation, wherein the optimizing comprises solving an aggregate objective function of all the penalty functions, the aggregate objective function being one of a minimum sum of all the penalty functions and a minimum maximum of all the penalty functions, a minimum sum optimization being used for minimizing average of one of response time, stretch, lateness, tardiness and service level agreement of the job and a minimum maximum optimization being used for minimizing a maximum of one of response time, stretch, lateness, tardiness and service level agreement of the job; and
defining slot resources as an arbitrary number of hosts that can perform concurrent jobs simultaneously over a defined execution time, wherein the job is one of the concurrent jobs, the job proceeds in multiple intervals with different intervals having different allocations, each interval contributes a portion of total work required to perform the job.

2. The computer program product of claim 1, further comprising computer readable program code of a MapReduce-configured system configured to partition time into epochs, wherein the planned allocation is valid for one epoch.

3. The computer program product of claim 1, further comprising:
computer readable program code configured to receive the user-entered metrics for the job,
wherein the computer readable program code configured to determine the planned allocation further comprises:
computer readable program code configured to allocate a minimum number of slots to each of the parallel and independent data tasks; and
computer readable program code configured to iteratively allocate additional slots based upon the user-entered metrics for the job.

4. A method for processing parallel and independent data tasks for a job, the method comprising:
receiving user-entered metrics for the job and a corresponding plurality of parallel and independent data tasks, each of the parallel and independent data tasks having a penalty function, wherein a sum of penalty functions measures a cost of completing the job at a particular time;
wherein the user-entered metrics is chosen by a system administrator on a cluster-wide basis, or by individual users on a job-by-job basis, such user-entered metrics is chosen from a menu comprising response time, makespan, stretch and any metric which rewards or penalizes job completion time as compared to deadlines;
tracking a number of slots. resources available for allocation over time; and
determining a planned allocation of slot resources over time for the parallel and independent data tasks based upon penalty function costs such that the planned allocation optimizes the user-entered metrics for the job,
wherein the planned allocation of slot resources comprises:
optimizing the user-entered metrics while ensuring minimum job slot guarantees, and avoiding job starvation, wherein the optimizing comprises solving an aggregate objective function of all the penalty functions, the aggregate objective function being one of a minimum sum of all the penalty functions and a minimum maximum of all the penalty functions, a minimum sum optimization being used for minimizing average of one of response time, stretch, lateness, tardiness and service level agreement of the job and a minimum maximum optimization being used for minimizing a maximum of one of response time, stretch, lateness, tardiness and service level agreement of the job, and
defining slot resources as an arbitrary number of hosts that can perform concurrent jobs simultaneously over a defined execution time, wherein the job is one of the concurrent jobs, the job proceeds in multiple intervals with different intervals having different allocations, each interval contributes a portion of total work required to perform the job.

5. The method of claim 4, the method further comprising:
allocating a minimum number of slot resources to each of the parallel and independent data tasks; and
iteratively allocating additional slot resources based upon the user-entered metrics for the job.

6. A system for allocating slot resources for data tasks comprising:
a memory device configured to store a plurality of instructions executable by the system;
a processor configured to receive user-entered metrics for a job and corresponding input data for a plurality of parallel and independent data tasks, each of the parallel and independent data tasks having a penalty function, wherein a sum of penalty functions measures a cost of completing the job at a particular time,
wherein the user-entered metrics is chosen by a system administrator on a cluster-wide basis, or by individual users on a job-by-job basis, such user-entered metrics is chosen from a menu comprising response time, makespan, stretch and any metric which rewards or penalizes job completion time as compared to deadlines; and the processor further configured to execute the plurality of instructions to perform a method comprising:
determining a planned allocation of slot resources over time for the plurality of parallel and independent data tasks based upon the penalty functions,
wherein the planned allocation of slot resources comprises:
optimizing the user-entered metrics while ensuring minimum job slot guarantees, and avoiding job starvation, wherein the optimizing comprises solving an aggregate objective function of all the penalty functions, the aggregate objective function being one of a minimum sum of all the penalty functions and a minimum maximum of all the penalty functions, a minimum sum optimization being used for minimizing average of one of response time, stretch, lateness, tardiness and service level agreement of the job and a minimum maximum optimization being used for minimizing a maximum of one of response time, stretch, lateness, tardiness and service level agreement of the job, and
defining slot resources as an arbitrary number of hosts that can perform concurrent jobs simultaneously over a defined execution time, wherein the job is one of the concurrent jobs, the job proceeds in multiple intervals with different intervals having different allocations, each interval contributes a portion of total work required to perform the job.

7. The system of claim 6, wherein the system is a MapReduce-configured system configured to partition time into epochs, wherein the planned allocation is valid for one epoch.

8. The system of claim 6, wherein the method performed further comprises:
allocating a minimum number of slot resources to each of the parallel and independent data tasks; and
iteratively allocating additional slot resources based upon the user-entered metrics for the job.

9. A system for processing parallel and independent data tasks, comprising:
a memory device configured to store a plurality of instructions embodying the system;
a processor configured to receive user-entered metrics for a job and corresponding input data for a plurality of parallel and independent data tasks, each of the parallel and independent data tasks having a penalty function, wherein a sum of penalty functions measures a cost of completing the job at a particular time,
wherein the user-entered metrics is chosen by a system administrator on a cluster-wide basis, or by individual users on a job-by-job basis, such user-entered metrics is chosen from a menu comprising response time, makespan, stretch and any metric which rewards or penalizes job completion time as compared to deadlines; and the processor further configured to execute the plurality of instructions to perform a method comprising:
determining a planned allocation of slot resources over time for the parallel and independent data tasks based upon the user-entered metrics for the job;
wherein the planned allocation of slot resources comprises:
optimizing the user-entered metrics while ensuring minimum job slot guarantees, and avoiding job starvation, wherein the optimizing comprises solving an aggregate objective function of all the penalty functions, the aggregate objective function being one of a minimum sum of all the penalty functions and a minimum maximum of all the penalty functions, a minimum sum optimization being used for minimizing average of one of response time, stretch, lateness, tardiness and service level agreement of the job and a minimum maximum optimization being used for minimizing a maximum of one of response time, stretch, lateness, tardiness and service level agreement of the job, and
defining slot resources as an arbitrary number of hosts that can perform concurrent jobs simultaneously over a defined execution time, wherein the job is one of the concurrent jobs the job proceeds in multiple intervals with different intervals having different allocations, each interval contributes a portion of total work required to perform the job.

10. The system of claim 9, wherein the method further comprises:
allocating a minimum number of slot resources for each of the parallel and independent data tasks; and
iteratively allocating additional slot resources based upon the user-entered metrics for the job.

* * * * *